3,546,144
CELLULAR POLYSULFONE RESINS AND
METHOD OF MANUFACTURE
Jean Chatelain, Massy-Palaiseau, France, assignor to Produits Chimiques Pechiney-Saint-Gobain, Neuilly-sur-Seine, France
No Drawing. Filed Mar. 14, 1966, Ser. No. 533,784
Claims priority, application France, Mar. 15, 1965, 9,242
Int. Cl. C08f 13/06, 47/10
U.S. Cl. 260—2.5      16 Claims

ABSTRACT OF THE DISCLOSURE

Polysulfone resins being copolymers of sulfur dioxide and at least one unsaturated hydrocarbon having at least three C atoms selected from the group consisting of aliphatic and aromtaic hydrocarbons, in the form of pearls of 0.5 to 2 mm. size having low hygroscopicity, thermally expansible and containing 5 to 10% of a volatile agent selected from the group consisting of unsaturated aliphatic, saturated aliphatic and cycloaliphatic hydrocarbons, are made by a method which comprises copolymerizing $SO_2$ and an unsaturated hydrocarbon having at least three C atoms selected from the group consisting of aliphatic and aromatic hydrocarbons, in aqueous suspension which includes a catalyst for the reaction which is soluble in the organic compound and a water soluble stabilizing colloid, and incorporating in the polysulfone during the process of its formation, a blowing agent from the class of unsaturated aliphatic, saturated aliphatic and cycloaliphatic hydrocarbons which are soluble in the polysulfone.

---

This invention relates to a new class of products, polysulfone resins containing a volatile agent, capable of being blown to expanded sizes by heat treatment.

Another object of the invention is to prepare heat expansible polysulfone resins in particles having forms and sizes particularly suitable for making expanded particles and bodies.

The objects of the invention are accomplished generally speaking by a method of bead polymerization which compirses copolymerizing $SO_2$ and an organic compound having at least three carbon atoms, of which two are included in an unsaturated organic radical, in aqueous suspension which includes a catalyst for the reaction, at least soluble in one of the copolymers, and in contact with organic blowing agents.

It was already known to prepare polysulfone resins by the polymerization in emulsion of sulfurous anhydride ($SO_2$) and unsaturated organic compounds. The polymerization took place in aqueous medium wherein the organic ingredients had been emulsified by the use of substantial quantities of emulsifiers. When the copolymerization had proceeded to its selected end point the polysulfone was flocculated, isolated, and washed for a long time to eliminate the emulsifier which had been retained by it. The polysulfone thus prepared was a powder of very small particles, it was moist, and it required a long time and considerable expense in fuel to dry it. Its excessive fineness made it difficult to employ in the molding or extrusion of objects. The polysulfones after drying were somewhat hydroscopic which impaired their utility and their shelf life. They could not be expanded by blowing agents.

According to the invention the polysulfone resins are prepared from sulfur dioxide and unsaturated organic compounds by polymerization in contact with catalysts which are soluble in at least one of the monomers, the polymerization proceeding in the aqueous medium whereinthe organic monomer is suspended, in the presence of cycloparaffinic, saturated aliphatic, or unsaturated aliphatic hydrocarbons, a preferred class of which may be an excess of the aliphatic monomer used in making the polysulfone.

The organic monomers are vinyl compounds in which the vinyl radical is attached to a nucleus which may be aliphatic, aromatic, and cyanogen. These compounds have at least three carbon atoms of which two are included in an unsaturated aliphatic radical. Illustrative of this class of compounds are butene-1, also called ethylethylene; propene, also called propylene; styrene, also called vinylbenzene; vinyltoluene and vinyl xylene, which are vinylbenzenes with hydrocarbon substituents on the aryl nucleus; and acrylonitrile, also called vinyl cyanide.

Among the hydrocarbons which may serve as blowing agents are butene, pentene, hexene, pentane, hexane, butane, the quantity employed being about 5% to 10% of the weight of the polymer. They should be soluble in, but not solvents of, the polysulfones and their boiling points at atmospheric pressure around 50° C. or lower.

Accoring to the process the organic monomers are suspended in an aqueous medium, usually water, by mechanical agitation of sufficient vigor to keep them in suspension. Frequently a water soluble colloid is dissolved in water before the suspension of the organic monomer in order to stabilize the suspension. Satisfactory stabilizers are water soluble cellulose derivatives such as the water soluble cellulose alcohols, esters, and ethers, examples of which are given in the following examples. It suffices to use from .1% to 2% by weight of the colloid based on the weight of the organic monomers which are to be suspended in the aqueous medium.

The blowing agents may be added at any stage prior to the completion of the polymerization, especially during the later stages.

The catalysis of the reaction has been explored by prior investigators and the catalysts used in the present invention are those known to the prior art which are soluble in the organic monomer. The peroxide catalysts, examples of which are isopropyl peroxydicarbonate and lauroyl peroxide, are exemplary. These catalysts are present in a quantity sufficient to produce from about 5 to about 20 mg. of active oxygen for each gramolecule of the organic monomer. The catalysts are usually added to the reaction medium dissolved in one of the monomers such as sulphur dioxide, as this has the particular advantage of producting more expandable pearls of the copolymer. These particles are readily produced in sizes from .5 to 2 mm.

After the suspension has been completed and the catalyst has been added, the copolymerization is accomplished by admitting sulfur dioxide to the reaction chamber under conditions of temperature and pressure favorable to the reaction. For example, the temperature is generally between 20° and 80° C. and the pressure will vary according to the vinyl monomer employed. If the temperature of polymerization is about 50° C. the pressure used will be about 2 kg./cm.² for styrene, about 7 to 9 kg./cm.² for butene-1, and 15 to 18 kg./cm.² for propene. With butene-1 the pressure will be about 9 kg./cm.² at the beginning, falling to about 7 kg./cm.² at the end at an operational temperature of 50° C. It is advantageous to use a substantial excess of $SO_2$, for instance from 50 to 200% more than will normally enter into the polymer. When the vinyl compound in suspension is aliphatic the maximum quantity of $SO_2$ which polymerize with it is about mole for mole whereas the molar ratio of $SO_2$ to aromatic vinyl compounds, accepted into the polymer, will be about 1:2.

This process has a particular advantage in that desirable ingredients can be incorporated in the polymer as it is being formed. For example from .01 to 5% of the weight of the polymer, of allyl bromide, or of aliphatic mercaptans can be mixed with the aqueous medium and will be incorporated in the product. It is possible, using this technique, to incorporate plasticizers such as methyl phthalate, butyl phthalate and butyl phosphate. It has been found feasible to add from 1–20% by weight of the plasticizer to the resin by this technique. They can be blown at any stage by immersing them in media hot enough to vaporize the blowing agent, e.g. 110° C.

The blowing agents are preferably chosen among those which have a boiling point not much above 50° C. at atmospheric pressure. The usual proportion of blowing agent to the weight of copolymer is 5–10%. They may be put into the reaction mass or mixed with either monomer. They may be used alone or together.

According a particularly advantageous form of the invention, which leads to more expansible polymers, the blowing agent is introduced in the polymerization mass towards the end of the polymerization. When a saturated hydrocarbon is used as blowing agent, this hydrocarbon is introduced in the reaction mass at the last period of the polymerization reaction.

When an excess of aliphatic hydrocarbon monomer is used as blowing agent, this hydrocarbon is introduced in the reaction mass in several times.

When an excess of aliphatic hydrocarbon monomer is used as blowing agent, the polymerization at an intermediate stage, after the polymer has formed but before all the organic monomer has reacted; the autoclave is vented to capture unused $SO_2$, the product is washed in water to remove residual $SO_2$, a pH of 5 to 6 indicating adequate washing, and the pearls of the product are stored or expanded at once, by heating. The process may be arrested by sharply increasing or decreasing its temperature.

The products produced in this way have excellent properties.

They are small pearls, which are readily washed and dried. After drying they are substantially non-hygroscopic, have good shelf life, pour without difficulty and are readily used for molding. They are little colored, and materially not hygroscopic.

The following examples illustrate the invention without imposing limitations on the generalities elsewhere herein stated.

EXAMPLE 1

A one liter glass autoclave heated by a water jacket and provided with a mechanical agitator of 3-blade impeller type, 2 cm. in diameter received 300 g. of water, .4 g. ethylhydroxyethylcellulose as a protective colloid, 1.05 ml. of a solution of isopropylperoxydicarbonate which was dissolved in ethyl phthalate and producing 1.72% of active oxygen, 56 g. of butene-1, 64 g. of $SO_2$, and .24 g. of allyl bromide. This was agitated for 6 hours at 45° C. at 250 r.p.m. producing pearls between .5 and .8 mm. in diameter which were washed with water to eliminate $SO_2$ and dried at 20° C. by air current. These pearls contained 7% of butene-1 which were not polymerized. They were dropped into boiling water and expanded to 15 times their initial volume. The content of the pearls in blowing agent was measured in a MacBain thermobalance. The loss of weight at 110° under an air current was measured over a period of three hours. The loss of weight was registered as a function of time, producing an equilateral hyperbola. It was concluded that a loss of weight on the asymptote for an infinite time corresponded to the content of expansion agent.

EXAMPLE 2

Operating as in Example 1 but replacing allyl bromide with 7 g. of tributyl phosphate produced pearls containing about 8% of unpolymerized butene-1. After expansion in hot water the volume increased 20 times.

EXAMPLE 3

Into the same apparatus used in the foregoing examples were placed 400 g. of deionized water, .2 g. of ethylhydroxyethylcellulose, .74 ml. of a solution of isopropylperoxydicarbonate dissolved in ethyl maleate and producing 1.32% active oxygen, 59 g. of butene-1 of 95% purity, and 128 g. of $SO_2$. It was agitated at 250 r.p.m. at 48° C. for 6 hours. The copolymerization was arrested by raising the temperature to 75° C. for an hour. After venting the autoclave the pearls of the product were washed in water until the wash water had a pH from 5 to 6. The pearls were dried in an air current. They had a diameter between .5 and 1.5 mm. and contained 9.5% of unpolymerized butene-1. They were completely expanded at 100° C. so that residual expansion agent was lacking, yielding a substance having the apparent density of .033 g. per cc. When expanded in a mold they had a density of .05 g. per cc.

EXAMPLE 4

A glass-lined autoclave of 40 liters capacity provided with an impeller of 30 cm. diameter and a water jacket for heating, received 12 liters of water containing 7 g. of ethylhydroxyethylcellulose. The atmosphere was evicted from the autoclave by 300 g. of butene-1 and 2360 g. of butene-1 of 95% purity, 5120 g. of $SO_2$ containing 21.5 ml. of isopropylperoxydicarbonate in ethyl maleate solution were dissolved, producing 2.3% of active oxygen. Agitation was at 70 r.p.m., the temperature at 48° C., the initial pressure 8.7 kg./cm.$^2$ at the beginning and 7.4 after 7 hours of reaction. The copolymerization was arrested by cooling to 25° C. and venting the autoclave. The pearls were washed to a pH of 5.6 and dried at 50° C. for 48 hours in an air current. The yield was 95% of transparent pearls about 1 mm. in diameter containing 5.2% of unpolymerized butene-1. When expanded at 110° C. the pearls had an apparent density of .035 g. per cm.$^3$. When expanded and then molded at 120° C. for 15 minutes they produced a homogeneous block of .05 g./cm.$^3$ density.

EXAMPLE 5

Operating under the conditions of Example 4 but arresting the copolymerization when the pressure was 7.8 kg./cm.$^2$ the yield was 85% and the pearls contained 8% of unpolymerized butene-1. When expanded at 110° C. they had an apparent density of .03 g./cm.$^3$. When molded after expansion in a mold of standard size at standard pressure they produced a homogeneous block of .04 g./cm.$^3$ density.

EXAMPLE 6

Operating under the conditions of Example 4 but interrupting the reaction at 8 kg./cm.$^2$ and heating the reaction medium at 80° C. for an hour the yield was 80%, and the pearls contained 8% of unpolymerized butene-1. When completely expanded they had a density of .02 g./cm.$^3$ When the expanded pearls were molded under standard conditions they produced a homogeneous block of .03 g./cm.$^3$ density.

EXAMPLE 7

Into the apparatus of Example 1 were put 300 ml. of water containing .3 g. of ethylhydroxyethylcellulose. The autoclave was purged with 10 g. of butene-1 and received .5 ml. of a solution of isopropylperoxydicarbonate in ethyl maleate providing 2.702% of active oxygen, 59 g. of 95% butene-1, 128 g. of $SO_2$. The reaction mass was carried with agitation of 250 r.p.m. to 48° C. at which the pressure reaches 8.5 kg./cm.$^2$. After 5 hours the pressure fell to 7.9 kg./cm.$^2$ and 10 g. of pentane was introduced, the pressure falling to 6.1 kg./cm.$^2$. The reaction was continued for 8 hours, the pressure falling slowly to 5.8 kg./cm.$^2$. The polymerization was stopped by cooling to 25° C. and the autoclave was vented. The product was composed of pearls which were washed to a pH of 5.6 and dried at 40° C. for 48 hours. The yield was 120 g. of dried product containing 8% of blowing agent. When blown at 110° C. the density was .055 g./cm.³. When this product was molded at 120° C. for 15 minutes under standard test conditions the product was a homogeneous block of .05 g./cm.³ density.

EXAMPLE 8

Employing the apparatus of Example 4, 12 liters of water containing 7 g. of ethylhydroxyethylcellulose were admitted. The autoclave was purged three times with 300 g. of butene-1; it then received 1180 g. of 95% butene-1, 5120 g. of $SO_2$ containing 21.5 ml. of isopropylperoxydicarbonate dissolved in ethyl maleate to provide 2.3% of active oxygen. Polymerization proceeded with agitation of 70 r.p.m. at 48° C. The initial pressure was 8.7 kg./cm.² which fell to 7.5 after 2 hours and 45 minutes. At this time 1180 g. of butene-1 were added and the pressure rose to 8.6 kg./cm.². After 5 hours, 45 minutes the pressure fell to 7.4 and the polymerizaion was arrested by cooling to 25° C. The pearls obtained were washed to a pH of 5 to 6 and dried for 48 hours at 40° C. under an air flow. The yield was 86.5% of transparent pearls 1 mm. in diameter containing 8.2% of unpolymerized butene-1. When completely expanded they had a density of .015 g./cm.³ and when molded under standard conditions a density of .025 g./cm.³.

EXAMPLE 9

The apparatus of Example 4 received 12 liters of water containing 7 g. of ethylhydroxyethylcellulose. It was purged three times with 300 g. of butene-1 and received 520 g. of butene-1, 5120 g. of $SO_2$ containing 21.5 ml. of a solution of isopropylperoxydicarbonate in ethyl maleate at a concentration producing 2.3% of active oxygen. The reaction mixture was agitated at 70 r.p.m. at 48° C. and the following additions were made at the times indicated:

2 hrs. 30 mins.—460 g. of butene-1
5 hrs.—410 g. of butene-1
7 hrs. 30 mins.—360 g. of butene-1
10 hrs.—320 g. of butene-1
12 hrs. 30 mins.—290 g. of butene-1.

The final pressure was 7.4 kg./cm.². The reaction was continued two hours more and arrested by chilling to 25° C. The product was washed to pH 5 to 6 and dried 48 hours at 40° C. in an air current. The yield was 85% of transparent pearls .9 mm. in diameter containing 8.5% of unpolymerized butene-1. When completely expanded they had a density of .01 g./cm.³ and when molded a density of .020 g./cm.³.

EXAMPLE 10

A glass-lined autoclave of 40 liters capacity having an impeller 30 cm. in diameter and a water jacket received 12 liters of water containing 7 g. of ethylhydroxyethylcellulose. It was purged three times with 300 g. of butene-1 and received 1180 g. of butene-1 of 95% purity, 5120 g. of $SO_2$ in which 21.5 ml. of a solution of isopropylperoxydicarbonate in ethyl maleate to provide 2.7% of active oxygen. The reaction mass was agitated at 70 r.p.m., the temperature raised to 48° C., the initial pressure was 8.7 kg./cm.² which fell to 7.5 kg./cm.² after 2 hours 45 minutes. At that time 1180 g. of 95% butene-1 were injected. The pressure rose to 8.6 kg./cm.², the reaction continued for 7 hours 45 minutes and the pressure fell to 6.4 kg./cm.². 600 g. of technical pentane were then injected, the agitation continuing and the temperature being maintained. The pressure stabilized at 5.1 kg./cm.². These conditions were maintained for 3 hours, the pressure remaining constant. The reaction mass was reduced to 25° C., the autoclave was vented, and the produce was washed, filtered, drained and dried by an air current at 40° C. The yield was 95% (based on the butene-1) of pearls having an average diameter of 1 mm. which included 5.7% of volatile products about half of which were pentane and the remainder hydrocarbons having 4 carbon atoms among which butene-1 was predominant. The pearls thus produced expanded perfectly producing molded objects of large size with a density below .025 g./cm.³. These pearls can be stored satisfactorily in air at room temperature, being still expansible after three months.

EXAMPLE 11

A 250-liter glass-lined autoclave having an impeller agitator 60 cm. in diameter and a water jacket received 60 liters of water containing 35 g. ethylhydroxyethylcellulose. It was purged with 1500 g. of butene-1 and received 5.9 kg. of butene-1 of 95%, 25.6 kg. of $SO_2$ containing 2.72% of active oxygen supplied by 100 ml. of isopropylperoxydicarbonate in ethyl maleate solution. This was raised to 65 r.p.m. at 48° C. The pressure was 8.6 kg./cm.² and fell to 7.4 after 2 hours and 15 minutes. There were then introduced 5.9 kg. of 95% butene-1. The reaction was continued for 7 hours 15 minutes, the final pressure being 5.9 kg./cm.². At this time 5 liters of pentane were injected and the process was continued for two hours at 48° C. The reaction mass was cooled and vented and the product was washed. The yield was 94% (based on the butene-1) of pearls which were washed, drained and dried. The average diameter of the pearls was .6 mm. and the content in volatiles was 5%, about half of which was pentane and the remainder $C_4$ hydrocarbons with butene-1 in major proportion. When expanded and molded the molded product has density below .025 g./cm.³.

The products produced by this invention are particularly valuable products for making expanded bodies of light densities. The several advantages are indicated in the examples. The use of an emulsifier is eliminated together with the labor of extracting it from the product, the products produced are especially pure, in some instances indicating identity with theoretical possibility. The addition of adjuvants such as mercaptans and allyl halides is an additional improvement of substantial value. The present invention provides polysulfones expansible by heat.

As many apparently widely different embodiments of the present invention may be made without departing from the spirit and scope thereof, it is to be understood that the invention is not limited to the specific embodiments.

What is claimed is:

1. Expansible polysulfone resins being copolymers of sulfur dioxide and at least one unsaturated mono vinyl hydrocarbon having at least three C atoms selected from the group consisting of aliphatic and aromatic hydrocarbons, in the form of individual pearls of 0.5 to 2 mm. size having low hygroscopicity, being thermally expansible and containing 5 to 10% of a volatile agent selected from the group consisting of unsaturated aliphatic, saturated aliphatic and cycloaliphatic hydrocarbons.

2. Polysulfone resins according to claim 1 having 5 to 10% of thermally expansible hydrocarbon.

3. Polysulfone resins according to claim 1 including a thermally expansible unsaturated aliphatic hydrocarbon.

4. Polysulfone resins according to claim 1 including a thermally expansible saturated aliphatic hydrocarbon.

5. Polysulfone resins according to claim 1 including a thermally expansible cycloaliphatic hydrocarbon.

6. Polysulfone resins according to claim 1 in which the blowing agent is an excess of organic monomer used in polysulfone resin formation.

7. Polysulfone resins according to claim 1 being copolymers of sulfur dioxide and at least one unsaturated hydrocarbon having at least three C atoms, of which two C atoms form an unsaturated aliphatic radical.

8. A method of making expansible polysulfone pearls which comprises copolymerizing $SO_2$ and an unsaturated hydrocarbon having at least three C atoms selected from the group consisting of aliphatic and aromatic hydrocarbons, in aqueous suspension which includes a catalyst for the reaction which is soluble in the organic compound and a water soluble stabilizing colloid, and incorporating in the polysulfone during the process of its formation, a blowing agent from the class of unsaturated aliphatic, saturated aliphatic and cycloaliphatic hydrocarbons which are soluble in the polysulfone.

9. A method according to claim 8 in which the polymerization is carried out at superatmospheric temperature and pressure with agitation sufficient to maintain the organic compound in suspension, but below the point at which the blowing agent vaporizes.

10. A method according to claim 9 in which the catalyst is an organic peroxide soluble in the comonomers.

11. A method according to claim 8 in which the aqueous suspension contains a water soluble cellulose derivative from the class consisting of water soluble cellulose alcohols, esters, and ethers.

12. A method according to claim 9 in which the aqueous suspension, during polymerization, contains a plasticizer for the polysulfone resin.

13. A method according to claim 8 which includes the steps of arresting the polymerization after the product has formed but before the $SO_2$ and organic monomer have fully reacted, and isolating and washing the product, free of $SO_2$, thereby entrapping unreacted organic monomer therein.

14. A method according to claim 13 in which the product is heated to vaporize the residual monomer and is thereby expanded.

15. Polysulfone resins being copolymers of sulfur dioxide and butene-1, in the form of pearls of 0.5 to 2 mm. size having low hygroscopicity, thermally expansible and containing 5 to 10% of a volatile agent selected from the group consisting of unsaturated aliphatic, saturated aliphatic and cycloaliphatic hydrocarbons.

16. A method of making expansible polysulfone pearls which comprises copolymerizing $SO_2$ and butene-1, in aqueous suspension which includes a catalyst for the reaction which is soluble in the butene-1 and a water soluble stabilizing colloid, and incorporating in the polysulfone during the process of its formation, a blowing agent from the class of unsaturated aliphatic, saturated aliphatic and cycloaliphatic hydrocarbons which are soluble in the polysulfone.

References Cited

UNITED STATES PATENTS

| | | | |
|---|---|---|---|
| 2,184,295 | 12/1939 | Frey et al. | 260—2.5 |
| 2,572,185 | 10/1951 | Noether et al. | |
| 2,686,171 | 8/1954 | Crouch. | |
| 2,943,077 | 6/1960 | deJong et al. | 260—2.5 |
| 3,058,929 | 10/1962 | Vanderhoff et al. | |
| 3,336,274 | 8/1967 | Youngman et al. | |

MURRAY TILLMAN, Primary Examiner

W. J. BRIGGS, Sr., Assistant Examiner

U.S. Cl. X.R.

260—13, 17, 33.6, 79.3